US012308593B2

(12) United States Patent
Beuschel et al.

(10) Patent No.: US 12,308,593 B2
(45) Date of Patent: May 20, 2025

(54) CRIMPING ELEMENT AND METHOD FOR PRODUCING A CRIMPING ELEMENT

(71) Applicant: Conti Temic microelectronic GmbH, Ingolstadt (DE)

(72) Inventors: Michael Beuschel, Stammham (DE); Stefan Bauer, Geisenfeld (DE); Johann Steinberger, Brunnen (DE)

(73) Assignee: Conti Temic microelectronic GmbH, Ingolstadt (DE)

( * ) Notice: Subject to any disclaimer, the term of this patent is extended or adjusted under 35 U.S.C. 154(b) by 422 days.

(21) Appl. No.: 17/915,937

(22) PCT Filed: Feb. 25, 2021

(86) PCT No.: PCT/DE2021/200022
§ 371 (c)(1),
(2) Date: Sep. 29, 2022

(87) PCT Pub. No.: WO2021/197550
PCT Pub. Date: Oct. 7, 2021

(65) Prior Publication Data

US 2023/0147954 A1 May 11, 2023

(30) Foreign Application Priority Data

Apr. 1, 2020 (DE) ..................... 10 2020 204 229.2

(51) Int. Cl.
*H01R 43/048* (2006.01)
*H01R 4/16* (2006.01)
*H01R 4/18* (2006.01)

(52) U.S. Cl.
CPC ............ *H01R 43/048* (2013.01); *H01R 4/16* (2013.01); *H01R 4/183* (2013.01)

(58) Field of Classification Search
CPC . H01R 4/16; H01R 4/18; H01R 4/183; H01R 43/04; H01R 43/042; H01R 43/048; H01R 12/50–69
(Continued)

(56) References Cited

U.S. PATENT DOCUMENTS 3,594,704 A * 7/1971 Fischer ................ H01R 4/2495 439/421
6,086,433 A * 7/2000 Hils ....................... H01R 4/185 439/850
(Continued)

FOREIGN PATENT DOCUMENTS

CN 107438920 A 12/2017
DE 102004036829 A1 3/2006
(Continued)

OTHER PUBLICATIONS

First Search dated Oct. 25, 2024 from corresponding Chinese patent application No. 202180026219.7.
(Continued)

*Primary Examiner* — Jared O Brown

(57) ABSTRACT

The crimping element for holding a wire with a nominal diameter of approximately 0.1 mm or less comprises sheet-metal with a base portion extending in a base plane and a holding portion connected to the base portion. The holding portion comprises first and second clamping elements spaced apart from each other by a holding portion recess. The first element comprises a first clamping portion extending in a first plane and connected to the base portion and a second clamping portion, forming a first clamping region for holding the wire. The second element comprises a third clamping portion extending in a second plane and connected to the base portion and a fourth clamping portion, forming a second clamping region for holding the wire The first plane forms a first angle approximately 0°-10° with the base
(Continued)

Figure 1:
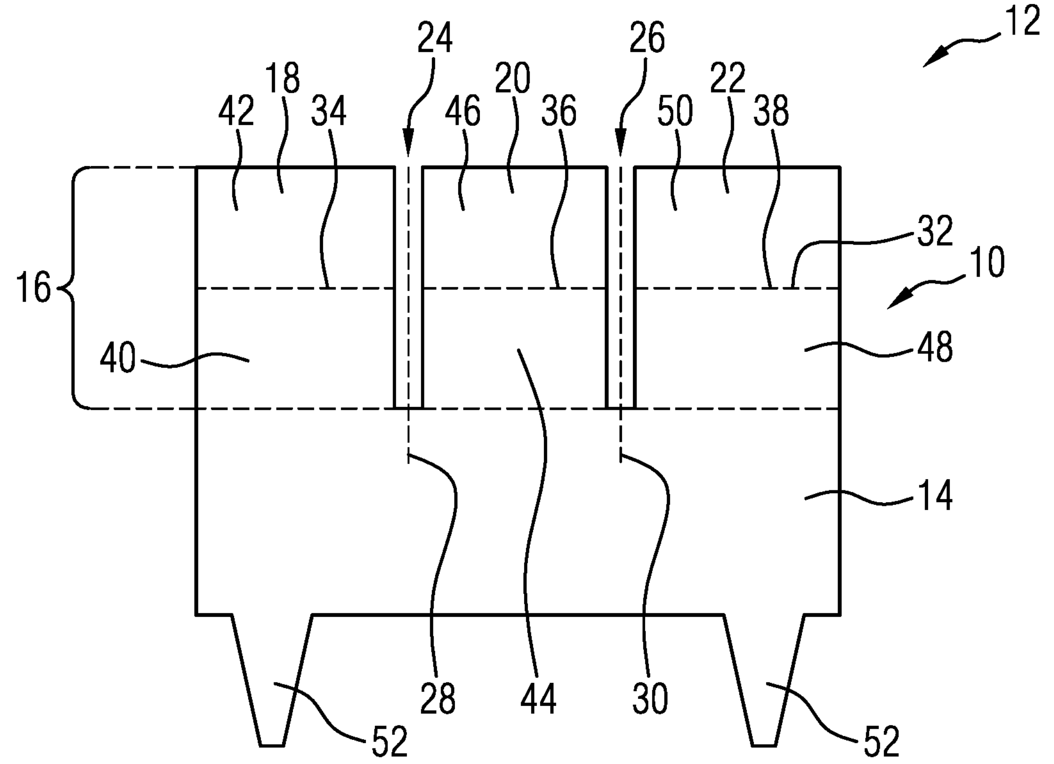

portion plane. The second plane forms a second angle approximately 1°-10° with the first plane.

20 Claims, 4 Drawing Sheets

(58) Field of Classification Search
USPC ............ 29/861, 863; 439/877; 140/105, 106
See application file for complete search history.

(56) References Cited

U.S. PATENT DOCUMENTS

| | | | | |
|---|---|---|---|---|
| 7,650,914 | B2 * | 1/2010 | Bogursky | H01R 43/048 140/105 |
| 8,113,243 | B2 | 2/2012 | Bogursky et al. | |
| 8,939,180 | B2 | 1/2015 | Bogursky et al. | |
| 9,419,348 | B2 * | 8/2016 | Krach | H01R 4/18 |
| 12,095,215 | B2 * | 9/2024 | Schwamberger | H01R 43/048 |
| 2007/0294873 | A1 | 12/2007 | Bogursky et al. | |
| 2015/0380838 | A1 | 12/2015 | Kollmann et al. | |
| 2016/0118723 | A1 | 4/2016 | Krach et al. | |
| 2019/0242370 | A1 | 8/2019 | Foshansky et al. | |

FOREIGN PATENT DOCUMENTS

| | | | | |
|---|---|---|---|---|
| DE | 102014115393 | B3 | 4/2016 | |
| DE | 202017104440 | U1 | 7/2018 | |
| DE | 202019101341 | U1 | 3/2020 | |
| EP | 0318007 | A2 | 5/1989 | |
| EP | 1610418 | A2 | 12/2005 | |
| EP | 1610418 | B1 | 9/2007 | |
| EP | 1870962 | A2 | 12/2007 | |
| EP | 1870962 | B1 | 4/2014 | |
| FR | 2673323 | A1 * | 8/1992 | H01R 4/01 |

OTHER PUBLICATIONS

First Office Action dated Oct. 25, 2024 from corresponding Chinese patent application No. 202180026219.7.
Office Action dated Dec. 14, 2020 from corresponding German patent application No. 10 2020 204 229.2.
Office Action dated May 20, 2021 from corresponding German patent application No. 10 2020 204 229.2.
International Search Report and Written Opinion dated May 19, 2021 from corresponding International patent application No. PCT/DE2021/200022.
Office Action dated Dec. 14, 2020 from related German patent application No. 10 2020 204 231.4.
Office Action dated May 20, 2021 from related German patent application No. 10 2020 204 231.4.
Office Action dated Aug. 26, 2022 from related German patent application No. 10 2020 204 231.4.

* cited by examiner

CRIMPING ELEMENT AND METHOD FOR PRODUCING A CRIMPING ELEMENT

The present invention relates to a crimping element for holding a wire with a nominal diameter of approximately 0.1 mm or less. The invention also relates to a method for producing a crimping element of this type.

For compact actuators, use is increasingly being made of shape memory alloy wires, the shape, in particular the length, of which changes when heated, and thus convert thermal (or electrical) energy into mechanical work. Of late, shape memory alloy wires of this type are used as valve actuators in small, compact valves for filling and/or emptying a fluid bladder or fluid chamber in pneumatic adjusting devices of pneumatically adjustable vehicle seats. The shape memory alloy wires, in particular in applications of this type, are what are known as ultra-fine wires and have a diameter of approximately 0.1 mm or less. These wires or ultra-fine wires must be electrically and mechanically connected to a printed circuit board, for example, in a cost-effective and reliable manner. This is usually done by means of a crimping technique, in which the wire is crimped by a crimping element. The material of the crimping element is usually considerably softer than the material of the wire, with the result that the wire is held by the crimping element by means of clamping when it is being crimped. In the process, the crimping element produces the mechanical and electrical connection between the wire and the printed circuit board, for example.

However, it has been shown that the wire can easily slip out of the crimping element in certain circumstances. In particular when the shape and the length of the wire changes, these changes occurring in the event of variation in the loading and temperature of shape memory alloy wires, it is possible for the wire to be pulled out of the crimping element and therefore the mechanical and electrical connection is disrupted.

It is therefore an object of the present invention to provide a crimping element for holding a wire (ultra-fine wire) with a nominal diameter of approximately 0.1 mm or less, which also ensures that the wire is reliably held in the event of many variations in loading and temperature of the wire. It is furthermore an object of the present invention to provide a method for producing a crimping element of this type.

These objects are achieved by a crimping element according to patent claim 1, and by a method for producing a crimping element of this type according to patent claim 9. Advantageous refinements are the subject matter of the dependent claims.

According to a first aspect of the present invention, a crimping element for holding a wire (ultra-fine wire) with a nominal diameter of approximately 0.1 mm or less is provided. In this respect, the crimping element comprises a sheet-metal element, which has a base portion extending in a base plane and a holding portion connected to the base portion, wherein the holding portion has a first clamping element and a second clamping element, which is spaced apart from the first clamping element by means of a recess in the holding portion. In this context, the recess may be a slot-shaped recess, for example, which extends along a direction of longitudinal extent or axis. The first clamping element has a first clamping portion, which is connected to the base portion, and a second clamping portion, which is connected to the first clamping portion, wherein the first clamping portion and the second clamping portion form a first clamping region for holding the wire between the first clamping portion and the second clamping portion. The second clamping element has a third clamping portion, which is connected to the base portion, and a fourth clamping portion, which is connected to the third clamping portion, wherein the third clamping portion and the fourth clamping portion form a second clamping region for holding the wire between the third clamping portion and the fourth clamping portion.

In the crimping element according to the invention, the first clamping portion of the first clamping element extends in a first plane, which forms a first angle that, in terms of magnitude, is in a range of approximately 0° to approximately 10° with the base plane of the base portion. Furthermore, in the crimping element according to the invention, the third clamping portion of the second clamping element extends in a second plane, which forms a second angle that, in terms of magnitude, is in a range of approximately 1° to approximately 10° with the first plane of the first clamping element. In other words, the second clamping element and the third clamping portion is tilted with respect to the first clamping element and the first clamping portion, respectively. This tilted arrangement, or the fact that the second plane forms an angle that, in terms of magnitude, is in a range of approximately 1° to approximately 10° with the first plane, provides a crimping element that can twist or shear the wire present in the clamping regions. This shearing leads to particularly good clamping of the wire, with the result that the wire can be reliably held by the crimping element even in the event of high variations in loading and temperature.

According to a further preferred configuration, the second angle, which the second plane forms with the first plane, in terms of magnitude is in a range of approximately 2° to approximately 3°. In such a configuration, the first clamping portion is substantially only slightly tilted with respect to the third clamping portion, or the third clamping portion is substantially only slightly tilted with respect to the first clamping portion, wherein the tilting in this case is in the region of the nominal diameter of the wire, thereby having particularly good long-term stability when the wire is being held.

In a further preferred configuration, the first angle, which the first plane forms with the base plane of the base portion, is approximately 0°. In other words, in this respect the first clamping portion extends in continuation of the base portion. In this configuration, only the third clamping portion is tilted relative to the first clamping portion, or the first clamping portion is tilted relative to the third clamping portion. There is no additional tilting between the first clamping portion and the base portion, and therefore the crimping element does not need to be bent additionally between the base portion and the first clamping portion, which is why a crimping element of this type can be produced particularly cost-effectively and easily.

According to a further preferred configuration, the second clamping portion and the first clamping portion are bent (or folded) about a first bending axis (or folding axis) and the first bending axis extends substantially perpendicularly with respect to a direction of longitudinal extent of the recess. It is also advantageous when the fourth clamping portion and the third clamping portion are also bent (or folded) around a second bending axis (or folding axis) and the second bending axis extends substantially parallel to the first bending axis. Moreover, when the two bending axes largely coincide, the second and the fourth clamping portion can be bent at the same time and thus cost-effectively in the same work step.

In a further preferred configuration, the crimping element also has a wire with a nominal diameter of approximately 0.1 mm or less, wherein the wire is arranged in the first clamping region and in the second clamping region in such a way that the wire extends along a direction of longitudinal extent of the wire, which extends substantially parallel to the first bending axis and parallel to the second bending axis, in the first clamping region and in the second clamping region. In this configuration, the wire is subjected to particularly uniform clamping in the first and the second clamping region, since the wire runs substantially parallel to the first and the second bending axis.

In a further preferred configuration, the holding portion of the sheet-metal element has a third clamping element, which is spaced apart from the second clamping element by means of a recess in the holding portion. The further recess, in turn, may be a slot-shaped recess extending along a further direction of longitudinal extent or axis. In this configuration, the third clamping element also has a fifth clamping portion, which is connected to the base portion, and a sixth clamping portion, which is connected to the fifth clamping portion, wherein the fifth clamping portion and the sixth clamping portion form a third clamping region for holding the wire between the fifth clamping portion and the sixth clamping portion, and wherein the fifth clamping portion of the third clamping element extends in a third plane, which substantially coincides with the first plane of the first clamping element. In this configuration, a crimping element with three clamping regions is provided, wherein the first clamping element and the third clamping element, or the first clamping portion and the fifth clamping portion, extend substantially in the same plane, and wherein the second clamping element, located between the first clamping element and the third clamping element, is tilted with respect to the other two clamping elements. This configuration provides a symmetrical crimping element, in which the wire is held even better, since the wire is sheared or twisted respectively between the middle and the outer clamping element, as a result of which the wire being pulled out of the crimping element is prevented even more reliably. It is particularly advantageous when, in this configuration, moreover the second angle is in a range that, in terms of magnitude, corresponds to merely half of the range mentioned above, that is to say is in a range that, in terms of magnitude, is approximately 0.5° to approximately 5°, in particular, in terms of magnitude, is approximately 1° to approximately 1.5°. This particularly advantageous configuration is based on the idea that the wire is ultimately twisted twice in the case of the symmetrical configuration of the crimping element, and as a result tilting by a half angle, in each case, is sufficient for the wire to be reliably held.

A further preferred configuration of the crimping element according to the invention provides that the base portion also has contact elements, which are designed for making electrical and mechanical contact with an electrical printed circuit board. The contact elements may be connected to a printed circuit board by means of soldering, for example. In addition to mechanical holding, the contact elements also serve for making electrical contact with the wire, as a result of which easy mechanical and electrical attachment of the wire to the printed circuit board is possible, in particular in the case of shape memory alloy wires.

According to a second aspect of the present invention, a method for producing a crimping element for holding a wire with a nominal diameter of approximately 0.1 mm or less is provided, wherein the crimping element has a sheet-metal element with a base portion extending in a base plane and a holding portion connected to the base portion, and wherein the holding portion has a first clamping element and a second clamping element, which is spaced apart from the first clamping element by means of a recess in the holding portion, wherein the first clamping element has a first clamping portion connected to the base portion and a second clamping portion connected to the first clamping portion, and the second clamping element has a third clamping portion connected to the base portion and a fourth clamping portion connected to the third clamping portion, and the method comprises the following steps: bending the second clamping portion about a first bending axis in such a way that the second clamping portion and the first clamping portion form a first clamping region for holding the wire; bending the fourth clamping portion about a second bending axis in such a way that the fourth clamping portion and the third clamping portion form a second clamping region for holding the wire; and tilting the third clamping portion relative to the first clamping portion or tilting the first clamping portion relative to the third clamping portion in such a way that the first clamping portion and the third clamping portion form an angle in relation to one another that, in terms of magnitude, is in a range of approximately 1° to approximately 10°. As a result of the tilting according to the invention of the third clamping portion relative to the first clamping portion or the tilting according to the invention of the first clamping portion relative to the third clamping portion, a wire arranged in the two clamping regions is twisted or sheared between the two clamping regions and, as a result, can be held steadily and reliably by the crimping element.

In a particularly preferred configuration of the method according to the invention, the third clamping portion is tilted relative to the first clamping portion or the first clamping portion is tilted relative to the third clamping portion in such a way that the first clamping portion and the third clamping portion form an angle in relation to one another that, in terms of magnitude, is in a range of approximately 2° to 3°. The result of such an angle range is that the tilting of the clamping portions in relation to one another is in a region of a nominal diameter of the wire, as a result of which the wire is held particularly reliably and steadily in the crimping element.

In a further preferred configuration of the method according to the invention, the third clamping portion is tilted relative to the first clamping portion or the first clamping portion is tilted relative to the third clamping portion before the second clamping portion is bent about the first bending axis and before the fourth clamping portion is bent about the second bending axis. In other words, first of all a twisting of the wire is created by tilting the clamping elements in relation to one another, wherein the wire is not yet fixed in the clamping regions and can still slip out in the clamping regions. Only when the wire has been twisted or the clamping elements have been tilted in relation to one another is the wire ultimately fixed in the two clamping regions by bending the respective clamping portions. In this preferred configuration, the fatigue strength of the wire held in the crimping element can be increased.

Figure 2:
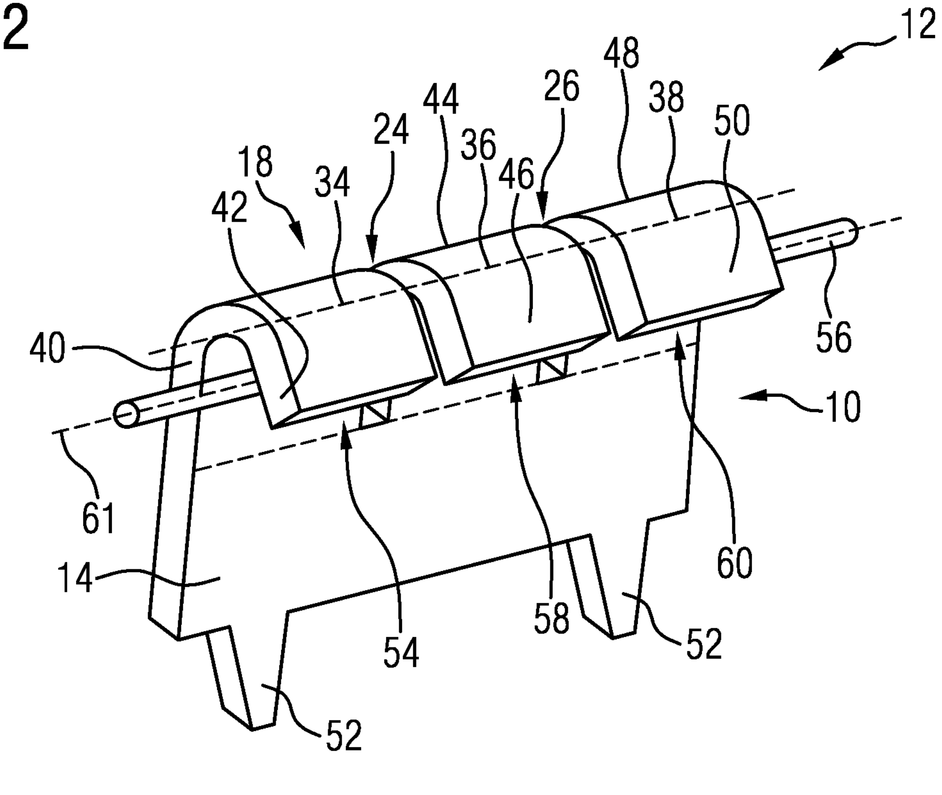
Figure 3:
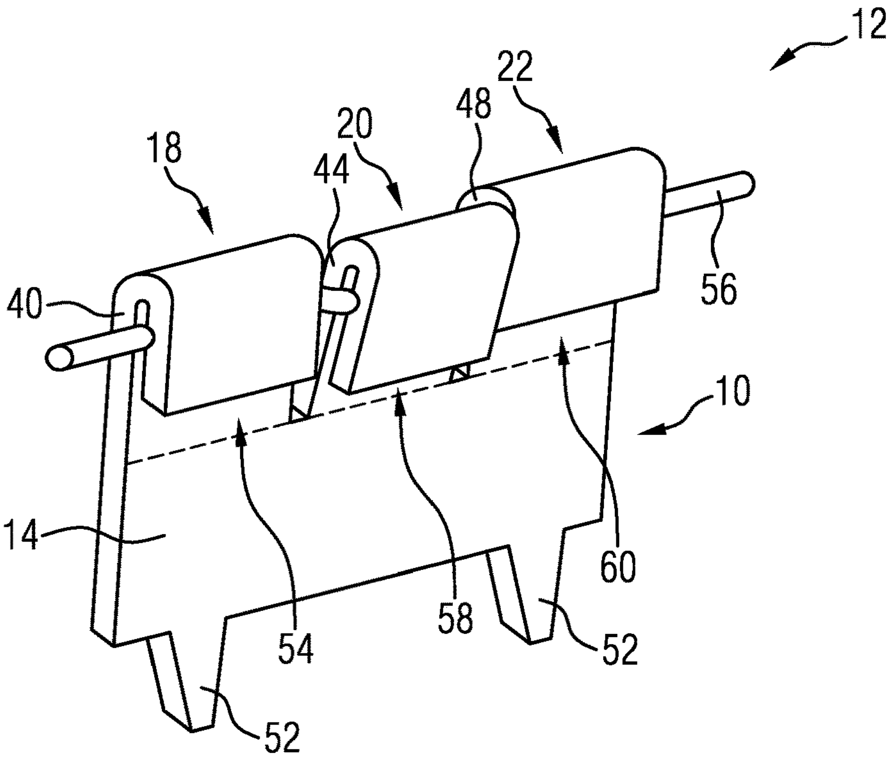
Figure 4:
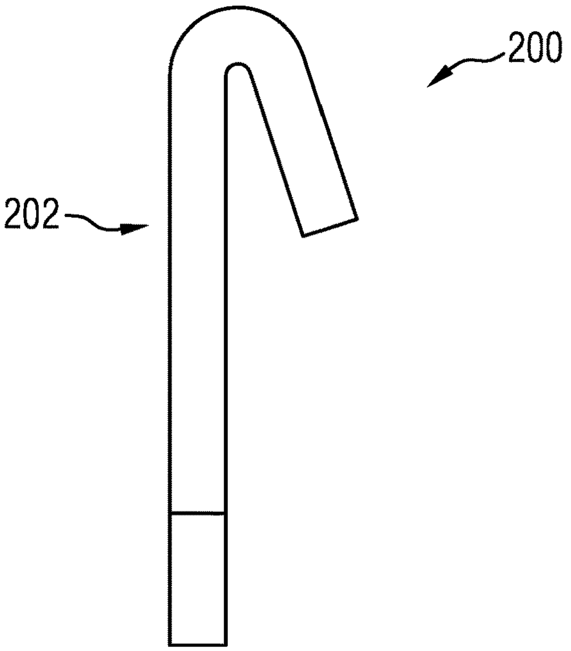
Figure 5:
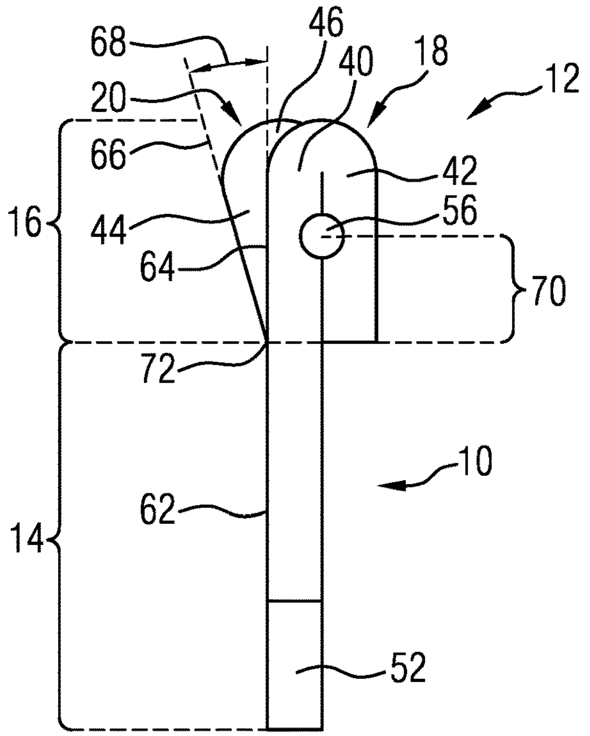
Figure 6:
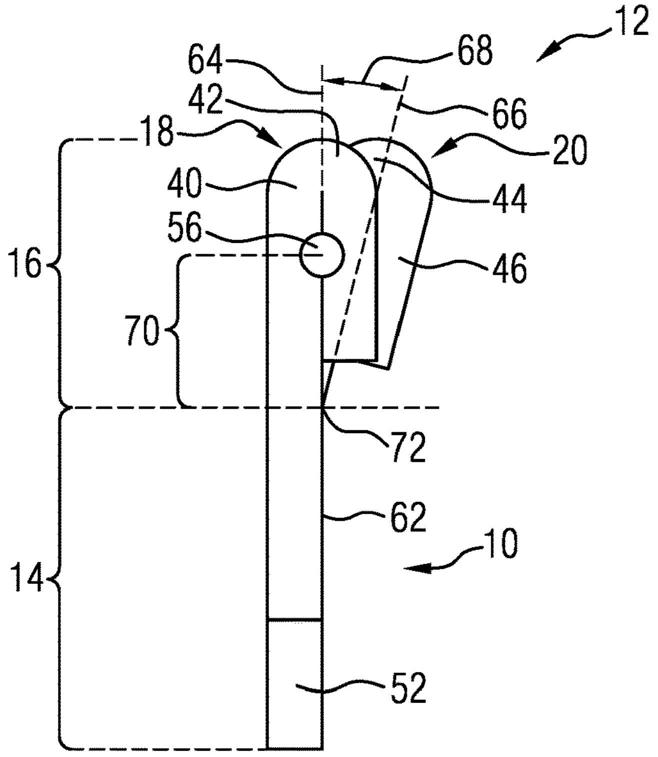
Figure 7:
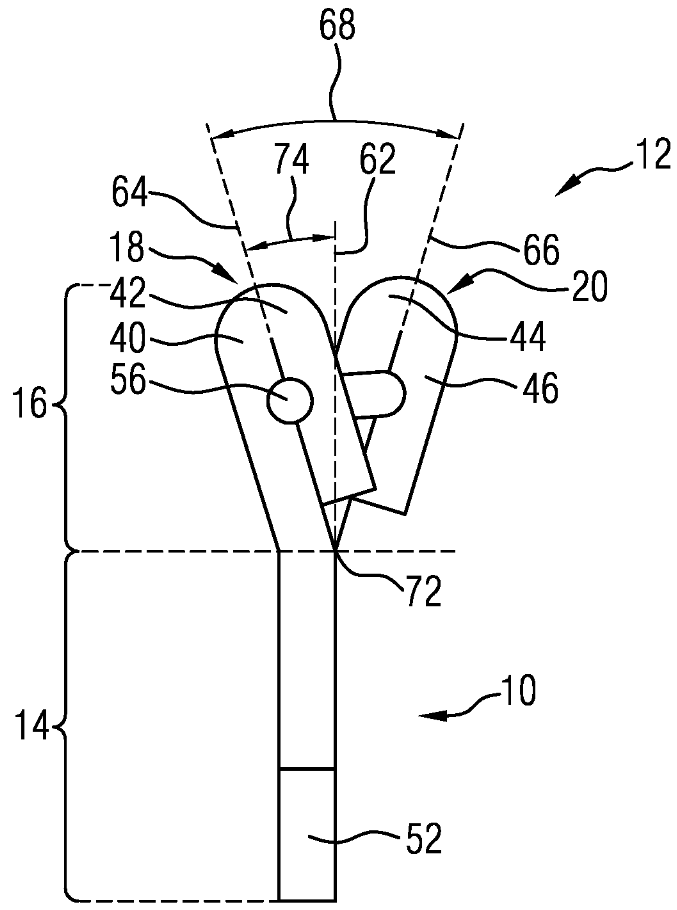

Further features and objects of the present invention will become apparent to a person skilled in the art by practicing the present teaching and taking into consideration the accompanying drawings. In the figures:

FIG. 1 shows a schematic view of a sheet-metal element with three clamping elements for producing one embodiment of a crimping element according to the invention, FIG. 2 shows a schematic view of the sheet-metal element of FIG. 1, in which clamping portions of the clamping elements are bent, for producing one embodiment of a crimping element according to the invention, FIG. 3 shows a schematic view of the sheet-metal element of FIG. 1 and FIG. 2, in which two clamping elements are tilted in relation to one another, for producing one embodiment of a crimping element according to the invention, FIG. 4 shows a schematic side view of a crimping element not in accordance with the invention, FIG. 5 shows a schematic side view of one embodiment of a crimping element according to the invention, FIG. 6 shows a schematic side view of another embodiment of a crimping element according to the invention, and FIG. 7 shows a schematic side view of another embodiment of a crimping element according to the invention.

Elements of identical design or function are provided with the same reference signs across all figures.

Reference is made firstly to FIG. 1, which shows a schematic view of a sheet-metal element 10 for producing a crimping element 12. The sheet-metal element 10, for example, has a thickness of 0.3 mm or less and has a base portion 14 and a holding portion 16 connected to the base portion 14. In the specific example of FIG. 1, the holding portion 16 has two substantially parallel slot-shaped recesses, which subdivide the holding portion 16 into three spaced apart clamping elements 18, 20 and 22. Specifically, the first clamping element 18 is spaced apart from the second clamping element 20 by a first recess 24. The second clamping element 20 is also spaced apart from the third clamping element 22 via a second recess 26. The recesses 24, 26 are substantially slot-shaped recesses, the first recess 24 extending along a first direction of longitudinal extent or axis 28 and the second recess 26 extending along a second, or further, direction of longitudinal extent 30, which is substantially parallel to and spaced apart from the first direction of longitudinal extent 28. The two slot-shaped recesses 24, 26 thus form tabs in the holding portion, which ultimately form the clamping elements 18, 20 and 22.

The clamping elements 18, 20 and 22 are also bendable or foldable along a bending axis 32. Thus, for example, the first clamping element 18 is bendable along a first bending axis 34, the second clamping element 20 is bendable along a second bending axis 36, and the third clamping element 22 is bendable along a third bending axis 38. In the specific example of FIG. 1, the first bending axis 34 extends substantially perpendicularly with respect to the first direction of longitudinal extent 28 of the first recess 24 and to the second direction of longitudinal extent 30 of the second recess 26. Similarly, in the specific example of FIG. 1, the second bending axis 36 and the third bending axis 38 each extend substantially perpendicularly with respect to the directions of longitudinal extent 28, 30 of the two recesses 24, 26. Moreover, in the specific example of FIG. 1, the first, second and third bending axes 34, 36 and 38 coincide to form a common bending axis 32, but may also run parallel to one another or obliquely with respect to one another, depending on the usage situation.

The first clamping element 18 also has a first clamping portion 40, which is connected to the base portion 14, and a second clamping portion 42, which is connected to the first clamping portion 40. The second clamping element 20 has a third clamping portion 44, which is connected to the base portion 14, and a fourth clamping portion 46, which is connected to the third clamping portion 44. The third clamping element 22 has a fifth clamping portion 48, which is connected to the base portion 14, and a sixth clamping portion 50, which is connected to the fifth clamping portion 48. The respective clamping portions of the respective clamping elements 18, 20, 22 are foldable or bendable toward one another along the respective bending axes 34, 36, 38, in order to form clamping regions for holding a wire, as will be described in more detail in conjunction with FIGS. 2 and 3.

As is also shown in FIG. 1, the base portion 14 has contact elements 52, which serve for making electrical and mechanical contact with an electrical printed circuit board (not shown). In the specific example of FIG. 1, the contact elements 52, for example, are in the form of plug-in projections for plugging into corresponding openings in the electrical printed circuit board. These plug-in projections, for example, may be electrically and mechanically connected to the electrical printed circuit board by means of soldering, by means of being pressed in, or by other means known to a person skilled in the art.

Reference will now be made to FIG. 2, which shows a schematic view of the sheet-metal element 10 of FIG. 1, the respective clamping portions of the respective clamping elements being bent toward one another about the respective bending axis in FIG. 2.

Specifically, the second clamping portion 42 and the first clamping portion 40 of the first clamping element 18 are bent toward one another about the first bending axis 34 in such a way that the first clamping portion 40 and the second clamping portion 42 form a first clamping region 54 between the first clamping portion 40 and the second clamping portion 42 for the purpose of holding a wire 56. Furthermore, the third clamping portion 44 and the fourth clamping portion 46 are bent toward one another about the second bending axis 36 in such a way that the third clamping portion 44 and the fourth clamping portion 46 form a second clamping region 58 between the third clamping portion 44 and the fourth clamping portion 46 for the purpose of holding the wire 56. Lastly, the fifth clamping portion 48 and the sixth clamping portion 50 are bent toward one another about the third bending axis 38 in such a way that the fifth clamping portion 48 and the sixth clamping portion 50 form a third clamping region 60 between the fifth clamping portion 48 and the sixth clamping portion 50 for the purpose of holding the wire 56.

In the specific example of FIG. 2, the wire 56 is an ultra-fine wire with a nominal diameter in a region of approximately 0.1 mm or less. Wires of this type, for example, are shape memory alloy wires, which are exposed to very frequent variations in loading and temperature and are used, for example, as actuators for valves in pneumatic adjusting devices for the pneumatic adjustment of a seat contact surface of a vehicle seat.

On account of the fact that the bending axes 34, 36, 38 are parallel to one another or coincide to form a common bending axis 32, and each of the bending axes 34, 36 and 38 extends substantially perpendicularly with respect to the directions of longitudinal extent 28, 30 of the two recesses 24, 26, it is possible to arrange the wire 56 in the clamping regions 54, 58 and 60 in such a way that a direction of longitudinal extent 61 of the wire 56 runs substantially parallel to the bending axes 34, 36 and 38.

Reference will now be made to FIG. 3, which shows a schematic view of the sheet-metal element 10 of FIGS. 1 and 2, two clamping elements or two clamping portions of the respective clamping elements being tilted in relation to one another in FIG. 3.

In the specific example of FIG. 3, the third clamping portion 44 of the second clamping element 20 is tilted by a predetermined angle relative to the first clamping portion 40 of the first clamping element 18. Similarly, the third clamping portion 44 of the second clamping element 20 is tilted by the predetermined angle relative to the fifth clamping portion 48 of the third clamping element 22. By contrast, however, the fifth clamping portion 48 of the third clamping element 22 is not tilted relative to the first clamping portion 40 of the first clamping element 18. This results in a substantially symmetrical arrangement of three adjacent clamping elements 18, 20, 22, it being the case in the specific example of FIG. 3 that the second clamping element 20, that is to say the middle clamping element, is tilted with respect to the two outer clamping elements 18, 22. The tilting of the middle clamping element 20 or the third clamping portion 44 relative to the first and the fifth clamping portion 40, 48 results in the wire 56 being twisted, so that the wire 56 is held particularly well and reliably in the clamping regions 54, 58 and 60. The crimping element 12 is thus distinguished by particularly reliable and secure holding of the wire 56.

In order ultimately to not subject the wire 56 to unnecessary loading or damage when it is being held in the crimping element 12, when the crimping element 12 is being produced first of all the third clamping portion 44 is tilted relative to the first clamping portion 40 and only then are the clamping portions 42, 46 and 50 bent about the respective bending axis 34, 36, 38. Such a sequence of the processing steps of the sheet-metal element 10 has the result that, when the third holding portion 44 is being tilted or when the second clamping element 20 is being tilted, the wire 56 is not yet completely fixed and the wire 56 can thus slip out, before, in the subsequent step, lastly the wire 56 is fixed in its offset and ultimate position by bending the clamping portions 42, 46 and 50. This selection or sequence of the processing steps of the sheet-metal element 10 largely avoids stretching or shearing of the wire 56 during the tilting operation, as a result of which the wire 56 is damaged less and the wire 56 thus has greater long-term stability.

In FIGS. 4 to 7 that now follow, a specific description will be given of the tilting of the clamping elements or clamping portions. For illustration purposes, first of all reference is made to FIG. 4, which shows a side view of a crimping element 200 not in accordance with the invention. In the crimping element 200 not in accordance with the invention, the clamping portions of the respective clamping elements are not tilted in relation to one another. The result of this is that, in FIG. 4 only one outer clamping element 202 can be seen and the further clamping elements, which lie behind the outer clamping element 202, have the same position in the side view of FIG. 4.

By contrast, FIG. 5 shows a side view of an exemplary embodiment of a crimping element 12 according to the invention, in which at least two clamping elements are tilted in relation to one another. In the side view of FIG. 5, this can be seen from the fact that the clamping elements 18, 20 or the first clamping portion 40 and the third clamping portion 44 have different positions in the side view of the crimping element 12.

In the specific example of FIG. 5, the base portion 14 extends in a base plane 62. Furthermore, the first clamping portion 40 of the first clamping element 18 extends in a first plane 64. In the specific example of FIG. 5, the first plane 64 coincides with the base plane 62, or the first plane 64 and the base plane 62 are parallel to one another. In other words, the first plane 64 and the base plane 62 form a first angle of approximately 0° in relation to one another. By contrast, however, the third clamping portion 44 of the second clamping element 20 extends in a second plane 66, which forms a second angle 68 that is not 0° with the first plane 64 in the specific example of FIG. 5. In the case of the crimping element 12 according to the invention, the second angle 68, in terms of magnitude, is in a range of approximately 1° to approximately 10°, preferably, in terms of magnitude, in a range of approximately 2° to approximately 3°.

A value of approximately 9° for the second angle 68 is obtained, for example, when the wire 56 has for example a spacing 70 of an order of magnitude of approximately 2 mm from an axis of rotation 72, about which the second clamping element 20 is rotated or tilted relative to the first clamping element 80, and moreover the third clamping portion 44 is tilted relative to the first clamping portion 40 by a thickness of 0.3 mm, which corresponds to the material thickness of the sheet-metal element 10, for example.

However, if the third clamping portion 44 is tilted much less, for example only by a nominal diameter of the wire 56, considerably smaller values result for the second angle 68. When the wire 56 has a nominal diameter of 0.076 mm, for example, and the third clamping portion 44 is tilted relative to the first clamping portion 40 only by the nominal diameter, given a spacing 70 of the order of magnitude of approximately 2 mm between the wire 56 and the axis of rotation 72 the result is a value for the second angle 68 of approximately 2°. Such a small tilt has the result that the wire 56 is not only held reliably, but at the same time the material stress that acts on the sheet-metal element 10 when the third clamping portion 44 is being tilted relative to the first clamping portion 40 is comparatively low. This increases the long-term stability of the wire 56.

Reference will now be made to FIG. 6, which shows another embodiment of the crimping element 12 according to the invention. In the exemplary embodiment shown in FIG. 6, it is also the case that the base portion 14 extends in a base plane 62, the first clamping portion 40 extends in a first plane 64, and the third clamping portion 44 extends in a second plane 66. As in the exemplary embodiment of FIG. 5, in the exemplary embodiment of FIG. 6 it is also the case that a first angle between the base plane 62 and the first plane 64 is approximately 0° and a second angle 68 between the second plane 66 and the first plane 64, in terms of magnitude, is approximately 1° to approximately 10°, preferably, in terms of magnitude, is in a range of approximately 2° to approximately 3°. However, in the exemplary embodiment of FIG. 6, the second clamping element 20 is tilted clockwise relative to the first clamping element 80, whereas in the exemplary embodiment of FIG. 5 the second clamping element 20 is tilted counterclockwise relative to the first clamping element 18. However, in both cases the second angle 68, in terms of magnitude, is in a range of approximately 1° to approximately 10°, preferably, in terms of magnitude, in a range of approximately 2° to approximately 3°. The embodiments of FIGS. 5 and 6 are intended to show that it does not matter whether the third clamping portion 44 is tilted clockwise or counterclockwise relative to the first clamping portion 40. What is important is that there is a tilt, and it is in the aforementioned angle range.

Reference will now be made to FIG. 7, which shows another embodiment of the crimping element 12 according to the invention. In the exemplary embodiment shown in FIG. 7, it is also the case that the base portion 14 extends in a base plane 62, the first clamping portion 40 extends in a first plane 64, and the third clamping portion 44 extends in a second plane 60. By contrast to the exemplary embodiments of FIGS. 5 and 6, however, the base plane 62 and the first plane 64 form a first angle 74 in a range which, in terms of magnitude, corresponds approximately to half of the range of the second angle 68. In other words: When, for example, the first plane 64 of the first clamping portion 40 and the second plane 66 of the third clamping portion 44 in turn form a second angle 68 which, in terms of magnitude, is in a range of approximately 1° to approximately 10°, preferably, in terms of magnitude, is in a range of approximately 2° to approximately 3°, a region of the first angle 74 is in a range, in terms of magnitude, of approximately 0.5° to approximately 5°, in particular approximately 1° to approximately 1.5°. In this configuration, moreover, when the first clamping portion 40 is tilted by the first angle 74 in a first, clockwise direction, and moreover the third clamping portion 44 is tilted in the counterclockwise direction (as illustrated by way of example in FIG. 7), a symmetrical arrangement is provided, which can hold the wire 56 particularly reliably. The exemplary embodiment of FIG. 7 is intended to show that it is entirely also possible for both the first clamping portion 40 to be tilted relative to the base portion 14 and for the third clamping portion 44 to be tilted relative to the first clamping portion 40 (and optionally also to the base portion 14).

Of course, other embodiments of the crimping element 12 according to the invention are conceivable. It is possible, for example, for the fifth clamping portion 50 to extend in a third plane that coincides with the first plane 64 of the first clamping portion 40. However, it is also conceivable for the fifth clamping portion 50 to extend in a third plane that does not coincide with the first plane 64, but forms a predetermined angle in relation to it. In all other respects, it is also conceivable for the third plane to likewise form a (identical or different) predetermined angle in relation to the second plane 66.

By virtue of the tilting of the clamping elements 18, 20, 22 or the clamping portions 40, 44, 48 in relation to one another, the crimping element 12 according to the invention ensures that the wire 56 is held reliably in the clamping regions 54, 58, 60 even in the event of frequent variations in loading and temperature. This is particularly advantageous for shape memory alloy wires, which are used as actuators for valves in pneumatic adjusting devices, since these wires are exposed to frequent variations in loading and temperature.

Although the crimping element 12 is shown in the form of an element consisting of three clamping elements 18, 20, 22 in conjunction with FIGS. 1 to 7, it is entirely conceivable for the crimping element 12, in other embodiments that are not shown, to have more or fewer than three clamping elements, but at least two clamping elements, that are tilted in relation to one another. Furthermore, in other exemplary embodiments of the crimping element 12 that are not shown, it is possible not only for the middle clamping element 20 to be tilted relative to the two outer clamping elements 18, 22, but it is also conceivable that one (or both) of the outer clamping elements 18, 22 is (or are, respectively) tilted relative to the middle clamping element 20.

In all other respects, it should be noted that FIGS. 1 to 7 are schematic drawings, and therefore specific values for the first or second angle should not be taken from the drawings. FIGS. 1 to 7 serve merely to illustrate the teaching disclosed in the present document.

The invention claimed is:

1. A crimping element for holding a wire with a nominal diameter of approximately 0.1 mm or less, comprising:

a sheet-metal element comprising a base portion extending in a base plane and a holding portion connected to the base portion, wherein the holding portion comprises a first clamping element and a second clamping element, which is spaced apart from the first clamping element by means of a recess in the holding portion, wherein the first clamping element comprises a first clamping portion connected to the base portion, and a second clamping portion connected to the first clamping portion, and the first clamping portion and the second clamping portion are bent toward one another about a first bending axis to form a first clamping region configured to hold the wire between the first clamping portion and the second clamping portion, wherein the second clamping element comprises a third clamping portion, which is connected to the base portion, and a fourth clamping portion, which is connected to the third clamping portion, and the third clamping portion and the fourth clamping portion are bent toward one another about a second bending axis to form a second clamping region configured to hold the wire between the third clamping portion and the fourth clamping portion, wherein the first clamping portion of the first clamping element extends in a first plane, which forms a first angle in a range of approximately 0° to 10° with the base plane of the base portion, and wherein the third clamping portion of the second clamping element extends in a second plane, which forms a second angle in a range of approximately 1° to 10° with the first plane.

2. The crimping element as claimed in claim 1, wherein the second angle is in a range of approximately 2° to 3°.

3. The crimping element as claimed in claim 1, wherein the first angle is approximately 0°.

4. The crimping element as claimed in claim 1, wherein the first bending axis extends substantially perpendicularly with respect to a direction of longitudinal extent of the recess.

5. The crimping element as claimed in claim 4, wherein the second bending axis extends substantially parallel to the first bending axis.

6. The crimping element as claimed in claim 1, wherein the holding portion comprises a third clamping element, which is spaced apart from the second clamping element by a further recess in the holding portion, wherein the third clamping element comprises a fifth clamping portion, which is connected to the base portion, and a sixth clamping portion, which is connected to the fifth clamping portion, and the fifth clamping portion and the sixth clamping portion form a third clamping region configured to hold the wire between the fifth clamping portion and the sixth clamping portion, wherein the fifth clamping portion of the third clamping element extends in a third plane, which substantially coincides with the first plane of the first clamping element.

7. The crimping element as claimed in claim 1, wherein the base portion also comprises contact elements, which are configured to make electrical and mechanical contact with an electrical printed circuit board.

8. The crimping element as claimed in claim 2, wherein the second clamping portion and the first clamping portion are bent toward one another about a first bending axis and the first bending axis extends substantially perpendicularly with respect to a direction of longitudinal extent of the recess.

9. The crimping element as claimed in claim 2, wherein the first angle is approximately 0°.

10. The crimping element as claimed in claim 9, wherein the base portion also comprises contact elements, which are configured to make electrical and mechanical contact with an electrical printed circuit board.

11. The crimping element as claimed in claim 3, wherein the second clamping portion and the first clamping portion are bent toward one another about a first bending axis and the first bending axis extends substantially perpendicularly with respect to a direction of longitudinal extent of the recess.

12. The crimping element as claimed in claim 11, wherein the base portion also comprises contact elements, which are configured to make electrical and mechanical contact with an electrical printed circuit board.

13. The crimping element as claimed in claim 4, wherein the base portion also comprises contact elements, which are configured to make electrical and mechanical contact with an electrical printed circuit board.

14. The crimping element as claimed in claim 5, wherein the base portion also comprises contact elements, which are configured to make electrical and mechanical contact with an electrical printed circuit board.

15. The crimping element as claimed in claim 6, wherein the base portion also comprises contact elements, which are configured to make electrical and mechanical contact with an electrical printed circuit board.

16. A crimping system, comprising:

a wire with a nominal diameter of approximately 0.1 mm or less, a crimping element for holding the wire, comprising:

a sheet-metal element comprising a base portion extending in a base plane and a holding portion connected to the base portion, wherein the holding portion comprises a first clamping element and a second clamping element, which is spaced apart from the first clamping element by means of a recess in the holding portion, wherein the first clamping element comprises a first clamping portion connected to the base portion, and a second clamping portion connected to the first clamping portion, and the first clamping portion and the second clamping portion are bent toward one another about a first bending axis to form a first clamping region configured to hold the wire between the first clamping portion and the second clamping portion, wherein the second clamping element comprises a third clamping portion, which is connected to the base portion, and a fourth clamping portion, which is connected to the third clamping portion, and the third clamping portion and the fourth clamping portion are bent toward one another about a second bending axis to form a second clamping region configured to hold the wire between the third clamping portion and the fourth clamping portion, wherein the first clamping portion of the first clamping element extends in a first plane, which forms a first angle in a range of approximately 0° to 10° with the base plane of the base portion, and wherein the third clamping portion of the second clamping element extends in a second plane, which forms a second angle in a range of approximately 1° to 10° with the first plane;

wherein the wire is arranged in the first clamping region and the second clamping region so that the wire extends along a direction of longitudinal extent of the wire, which extends substantially parallel to the first bending axis and substantially parallel to the second bending axis, in the first clamping region and in the second clamping region.

17. The crimping system as claimed in claim 16, wherein the base portion also comprises contact elements, which are configured to make electrical and mechanical contact with an electrical printed circuit board.

18. A method for producing a crimping element for holding a wire with a nominal diameter of approximately 0.1 mm or less, wherein the crimping element comprises a sheet-metal element with a base portion extending in a base plane and a holding portion connected to the base portion, wherein the holding portion comprises a first clamping element and a second clamping element, which is spaced apart from the first clamping element by means of a recess in the holding portion, wherein the first clamping element comprises a first clamping portion connected to the base portion and a second clamping portion connected to the first clamping portion, and the second clamping element comprises a third clamping portion connected to the base portion and a fourth clamping portion connected to the third clamping portion, and the method comprises the following steps of:

bending the second clamping portion about a first bending axis so that the second clamping portion and the first clamping portion form a first clamping region configured to hold the wire;

bending the fourth clamping portion about a second bending axis so that the fourth clamping portion and the third clamping portion form a second clamping region configured to hold the wire; and tilting the third clamping portion relative to the first clamping portion or tilting the first clamping portion relative to the third clamping portion so that the first clamping portion and the third clamping portion form an angle in relation to one another in a range of approximately 1° to approximately 10°.

19. The method as claimed in claim 18, wherein the third clamping portion is tilted relative to the first clamping portion or the first clamping portion is tilted relative to the third clamping portion so that the first clamping portion and the third clamping portion form the angle in relation to one another that is in a range of approximately 2° to 3°.

20. The method as claimed in claim 18, wherein the third clamping portion is tilted relative to the first clamping portion or the first clamping portion is tilted relative to the third clamping portion before the second clamping portion is bent about the first bending axis and before the fourth clamping portion is bent about the second bending axis.

* * * * *